Figure 1:
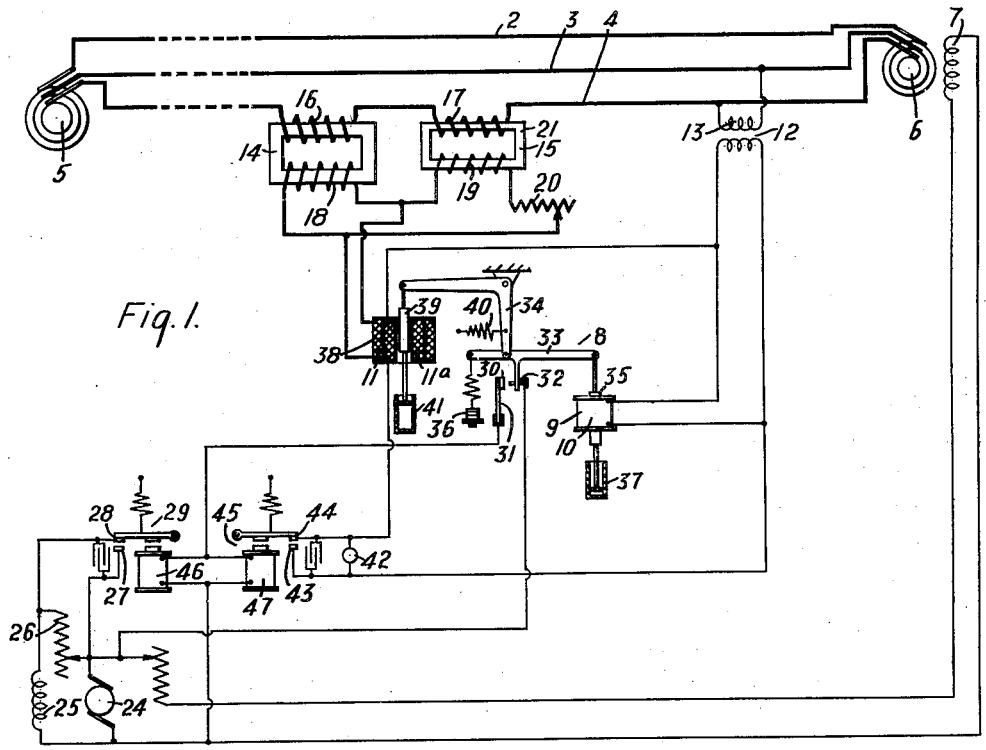

W. R. WOODWARD.
REGULATING SYSTEM.
APPLICATION FILED JULY 11, 1916.

1,338,718.

Patented May 4, 1920.

WITNESSES:
Fred. A. Lind
Geo. W. Hansen.

INVENTOR
Walter R. Woodward
BY
Wesley G. Carr
ATTORNEY

UNITED STATES PATENT OFFICE.

WALTER R. WOODWARD, OF WILKINSBURG, PENNSYLVANIA, ASSIGNOR TO WESTINGHOUSE ELECTRIC AND MANUFACTURING COMPANY, A CORPORATION OF PENNSYLVANIA.

REGULATING SYSTEM.

1,338,718.      Specification of Letters Patent.      Patented May 4, 1920.

Application filed July 11, 1916. Serial No. 108,574.

*To all whom it may concern:*

Be it known that I, WALTER R. WOODWARD, a citizen of the United States, and a resident of Wilkinsburg, in the county of Allegheny and State of Pennsylvania, have invented a new and useful Improvement in Regulating Systems, of which the following is a specification.

My invention relates to electrical regulating systems, and it has special relation to means for controlling a regulated electrical circuit in a predetermined manner until a certain condition obtains in the circuit or a certain load is reached, when it is important to radically depart from the conditions previously maintained in order to protect the apparatus connected in circuit against abnormal over-voltages, overloads, or any other dangerous and undesirable conditions.

More particularly, my invention relates to a combination of current transformers of different characteristics which are used in conjunction with an automatic regulator that is employed to regulate, in a certain predetermined manner, the electrical conditions obtaining in a regulated circuit.

It is usual to employ synchronous condensers in connection with power systems for power-factor correcting purposes. When an over-excited synchronous motor is thus utilized to regulate the power-factor obtaining in a power system that is subject to wide load fluctuations, such as obtain in a railway system, the synchronous condenser is liable, under certain conditions, to be heavily overloaded. For instance, if a heavy overload occurs in the railway circuit, the synchronous condenser, in its endeavor to maintain a constant power-factor in the circuit, will be loaded beyond its capacity if its field excitation is regulated, under all conditions, in accordance with the loads in the circuit. In order to prevent the synchronous condenser from being subjected to overloads in this manner, it is necessary to provide some automatic means for lowering the voltage of the synchronous condenser or decreasing its field excitation when a certain predetermined kilovolt-ampere load is imposed upon the condenser. At the same time, it is desirable to hold the voltage of the synchronous condenser at normal value or to regulate its field excitation to mainain a constant-power-factor in the circuit, up to the point where full-load or a certain predetermined kilovolt-ampere input is delivered to the synchronous condenser. In order to regulate the field excitation or the voltage of the synchronous condenser in the manner indicated above, I propose a combination of dissimilar current or series transformers which are so related with respect to each other that, up to a certain load in the regulated circuit, the transformers will govern the electrical conditions obtaining therein in a certain predetermined manner. After this predetermined condition is reached, or, in this particular instance, when the synchronous condenser is loaded to its full kilovolt-ampere capacity, this combination of current transformers so influences the automatic regulator controlling the field excitation of the synchronous condenser that the condenser will be relieved and protected against overloads. Of course, it will be understood that this is a single application only of the combination of current transformers herein disclosed, since this combination may be used in a variety of ways for controlling the electrical conditions obtaining in an electrical circuit that is to be regulated in a predetermined manner.

For a better understanding of the nature and scope of my invention, reference may be had to the following description and the accompanying drawing in which—

Figure 2:
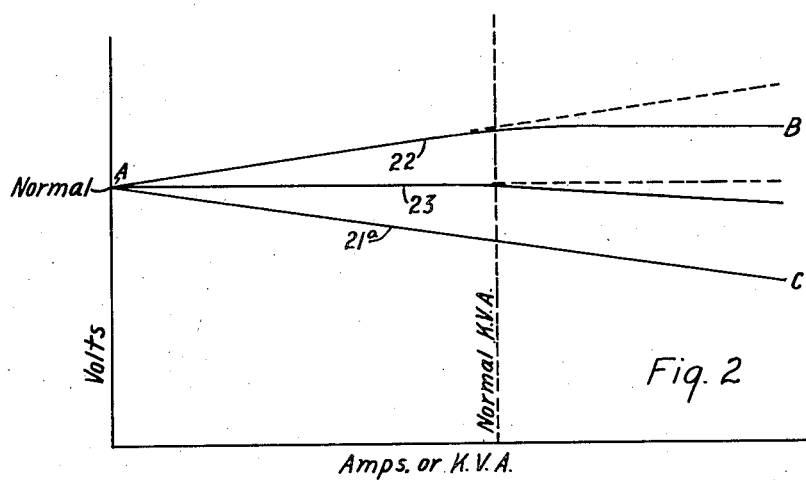

Figure 1 is a diagrammatic view of an electrical distributing system embodying a form of my invention, and Fig. 2 is a diagram of graphs illustrating the relationship between the voltages induced in the secondary windings of the current transformers of Fig. 1 and the amperes or kilovolt-amperes obtaining in the regulated circuit.

Referring to Fig. 1, a power-distributing circuit, which comprises conductors 2, 3 and 4 and is subject to heavy overloads, is furnished with power from a three-phase alternator 5. A three-phase synchronous condenser 6 is connected at the far end of the distributing circuit and is employed, in the usual way, for correcting and improving the power-factor obtaining in the power circuit. In this instance, the power-factor correction is effected by over exciting a field winding 7 of the synchronous condenser 6.

The excitation of the field winding 7 is controlled by means of an automatic regulator 8 of the Tirrill type which comprises an electromagnet 9 having a winding 10 and a main electromagnet 38 having windings 11 and 11ª. The windings 10 and 11ª are excited by means of a voltage transformer 12, the primary winding 13 of which is connected across the mains 3 and 4 of the power circuit. The winding 11 is excited by means of two current transformers 14 and 15. The transformers 14 and 15 have their primary windings 16 and 17 respectively connected in series-circuit relationship with the power conductor 4, and their secondary windings 18 and 19 connected in opposition across the winding 11 of the electromagnet 38. An adjustable resistance or impedance device 20 is inserted for varying the degree and quality of load on the secondary winding 19 of the current transformer 15. The current transformer 14 is so designed as to have a good ratio characteristic over any range of current that may flow through the primary winding 16. The transformer 15 is so designed that its magnetic circuit 21 becomes magnetically saturated when a predetermined current flows through the primary winding 17. As a result, the secondary current flowing in the winding 19 is proportional to the primary current, up to a predetermined current value, and above that value of current in the primary winding, the ratio between the secondary current and the primary current falls off rapidly. In other words, the ratio between the voltage induced in the winding 19 and the current traversing the winding 17 decreases after a certain predetermined current value in the winding 17 has been reached.

The graphs shown in Fig. 2 illustrate the voltage regulation of the separate transformers 14 and 15. For instance, the graph 21ª represents the voltage regulation of the system as influenced by the transformer 14, in conjunction with relay 38, said transformer having a good ratio characteristic over any range of primary current that may flow in the primary winding 16. The graph 22 represents the voltage regulation of the system as influenced by the current transformer 15, in conjunction with the relay 38, the difference between the lines A—B and A—C resulting from the saturation of the magnetic core member 21. It will be noted that the regularity of the line A—B is discontinued at the abscissa indicated as "Normal kilovolt-amperes," the predetermined load at which the magnetic core 21 is designed to become magnetically saturated. The windings 18 and 19, respectively, of the transformers 14 and 15 are connected in opposition to each other across the winding 11 of the electromagnet 38, as mentioned above, and, therefore, the effective voltage, in producing voltage regulation through the action of the winding 11 of the electromagnet 38, is shown by the graph 23 which, in this particular instance, comprises a horizontal portion, having its ordinate indicated as "Normal," up to the abscissa indicated by "Normal kilovolt-amperes." Beyond this point, the graph 21ª predominates or, in other words, the voltage induced in the winding 18 predominates and influences the current flow through the winding 11 of the electromagnet 38 so that it may operate in a predetermined manner.

The field winding 7 of the synchronous condenser 6 is supplied with exciting current from an exciter 24. The exciter is provided with a field-magnet winding 25 that is preferably shunt excited, though it may be supplied with current from any other suitable source. In series with the winding 25, is a resistor 26 that is adapted to be shunted by means of coöperating stationary and movable contact terminals 27 and 28 of a relay 29 which constitutes a part of the regulator 8. A stationary contact terminal 30, which is supported upon the end of a plate spring 31, coöperates with a movable contact member 32 that is mounted on a lever 33. The lever 33 is pivotally supported or fulcrumed upon the lower end of the vertical arm of a bell-crank lever 34 and is actuated by the electromagnet 9, the winding 10 of which is energized as hereinbefore mentioned. Under normal conditions, the electromagnet 9 is energized in proportion to the voltage of the distributing circuit. Similarly, the electromagnet 38 is energized in proportion to the voltage of the distributing circuit, since the windings 18 and 19 are connected in opposition across the winding 11 and, in this instance, have voltages induced in them that counteract each other, and, when the kilovolt-ampere output from the synchronous condenser 6 exceeds the normal kilovolt-ampere output, the winding 18 becomes active, as explained in connection with the graphs of Fig. 2, thereby influencing the operation of the electromagnet 38 to decrease the field excitation of the winding 7 of the synchronous condenser, as will be hereinafter indicated.

The electromagnet 9 comprises a core member 35 that is pivotally connected to the lever 33 and is partially counterbalanced by an adjustable counterweight 36, the winding 10 serving, when sufficiently energized, to raise the core 35. A dash pot 37 assists in retarding the movements of the core member 35. The varying excitation of the electromagnet 9, which is occasioned by the winding 10 only, serves to vary the distance of the contact terminal 32 from the stationary contact terminal 30. The lever 34 is so actuated as to move the contact terminal 32 substantially horizontally into and out of engagement with the contact member 30 by means of the electromagnet 38, the core member 39 of which is drawn downwardly in opposition to a spring 40 when the electromagnet 38 is sufficiently energized. A dash pot 41 serves to retard the movements of the core member 39. A resistor 42, which may be an incandescent lamp, is connected in series with the winding 11ᵃ of the electromagnet 38 and is adapted to be shunted by means of coöperating stationary and movable contact terminals 43 and 44 of a relay 45. The relays 29 and 45 are provided with parallel-connected actuating windings 46 and 47, respectively, that receive energy from the exciter 24 or any other suitable source and the circuits of which are governed by the contact members 30 and 32. This regulator is shown and described in detail in U. S. Patent No. 1,147,576.

Referring again to the effect of the coils 11 and 11ᵃ, and designating as normal operation that period of operation prior to the tendency to overload the synchronous condenser, it will be understood that the normal energization of the coil 11ᵃ is in one direction or the other, as dictated by the necessity for a rise or fall in the voltage of the system. When, however, the synchronous condenser tends to deliver kilovolt-amperes in excess of a predetermined amount, the saturation of transformer 15 results in the transformer 14 predominating in the determination of the amount of current which will flow in the coil 11. In the system as illustrated, I have assumed that the energization of the coil 11 is such that a pull will be exerted upon the armature 39 in the same direction as is exerted thereupon when the regulator functions to decrease the voltage upon the system. Inasmuch, however, as coils 11 and 11ᵃ are now exerting a pull in the same direction, less voltage will be necessary in the transformer 13 to produce the desired voltage regulation and, therefore, by reason of the interaction of the two coils, the voltage on the system will decrease. In other words, the function of the coil 11 whose energization is governed in accordance with the load current, after a predetermined value of such current has been reached, is to so supplement the pull exercised upon the armature 39 as to require the coil 11ᵃ to be energized in a lesser degree than it is during normal operation, or during the time prior to the tendency to over-excitation of the synchronous condenser.

Under normal conditions or up to the point where the kilovolt-ampere output of the synchronous condenser 6 does not exceed its normal value, as indicated in Fig. 2, the regulator 8 will operate in its usual manner, since the winding 11 of the electromagnet 38 exerts no influence on the operation of the electromagnet 38, under these conditions. When, however, the kilovolt-ampere load upon the condenser 6 exceeds the normal value, the regulator 8, by reason of the inter-relation of the exciting windings 11 and 11ᵃ of the main electromagnet 38, as shown by the graph 23 of Fig. 2, will operate to lower the exciting current flowing through the field winding 7 of the synchronous condenser. In this manner, the synchronous condenser is prevented from being overloaded, since its exciting current is rapidly decreased and, therefore, the voltage induced in the synchronous condenser 6 is lowered.

By properly proportioning the ratios of the current transformers 14 and 15 and varying the adjustment of the impedance device 20, it will be possible to produce any voltage regulation desired, within certain limits. For instance, it will be possible to vary the graph 23 of Fig. 2 in such fashion as to produce a rising voltage characteristic from no-load to normal and then an approximately constant-voltage characteristic for loads exceeding the normal value, or it will be possible to vary the graph 23 so as to produce a regulation which has a drooping characteristic from no-load to full load and a much more pronounced drooping characteristic for loads exceeding the normal value. The application of the current transformers 14 and 15 is not limited to a voltage regulator, such as I have shown at 8, but may be applied to many other devices the operation of which it is desired to vary or control in accordance with certain predetermined conditions.

While I have shown one embodiment only of my invention, it is apparent that many modifications may be made therein without departing from the scope and spirit of the appended claims.

I claim as my invention:

1. In an alternating-current distributing system, the combination with a current-carrying winding, of a plurality of transformers connected to said distributing systems and jointly generating the current that traverses said winding, said transformers having dissimilar regulation characteristics and one of them predominating in determining the current flow through said winding after predetermined load conditions obtain in the distributing system.

2. In an alternating-current distributing system, the combination with an automatic regulator comprising an actuating magnet provided with a current-carrying winding, and a device influenced by said regulator, of a plurality of transformers connected in circuit with said distributing system for jointly influencing the current-carrying winding of said actuating magnet, said transformers having dissimilar regulation characteristics whereby the normal action of the regulator up to a certain predetermined load condition in the distributing system is discontinued after said load condition is reached.

3. In an alternating-current distributing system, the combination with a synchronous condenser utilized for power factor correction purposes, of an automatic regulator to vary the field excitation of said condenser, said regulator having a plurality of current-carrying windings, one of said windings being energized in accordance with the voltage obtaining in said system, and the other of said windings being energized in accordance with the load current in said system only when predetermined load conditions exist on said system.

4. In an alternating-current distributing system, an automatic regulator comprising an actuating magnet provided with current-carrying windings, one of which is energized in accordance with the voltage obtaining in said system, and a plurality of transformers connected in circuit with said distributing system for jointly influencing another winding of said magnet, said transformers having dissimilar regulation characteristics whereby the second winding is energized only after a predetermined load condition is reached.

5. In an alternating-current distributing system, a synchronous condenser, a regulator for automatically controlling the field excitation thereof, said regulator having current-carrying windings, one of which is energized in accordance with the voltage obtaining in said system, and a plurality of series transformers having dissimilar voltage characteristics connected to the distributing system and adapted to have their primary members traversed by load current for jointly influencing the current furnished to another winding of said magnet, the normal action of the regulator being governed by said voltage-controlled coil, and said load-current governed coil becoming effective only after the output from said synchronous condenser reaches a predetermined value.

6. In an alternating-current distributing system, the combination with a synchronous condenser utilized for power factor correction purposes, of an automatic regulator to vary the field excitation of said condenser, said regulator having a plurality of current-carrying windings, one of said windings being energized in accordance with the voltage obtaining in said system, and two series transformers of dissimilar regulation characteristics connected in circuit with the distributing system and having their secondary windings connected in opposition across another current-carrying coil on said regulator whereby the latter coil is energized in accordance with the load current in said system only when predetermined load conditions exist on said system.

7. In a current-regulating system, the combination of a pair of current-transformers having dissimilar regulation characteristics, said transformers having their secondary windings connected in series-circuit relation, whereby said windings produce electromotive forces that assist each other and produce the condition of short-circuit operation, and leads from the terminals of one of said secondary windings adapted to be connected to a regulating device.

8. A system as specified in claim 7, in combination with means for varying the effect of one of said secondary windings.

In testimony whereof, I have hereunto subscribed my name this 29th day of June, 1916.

WALTER R. WOODWARD.